Patented Jan. 7, 1947

2,413,696

UNITED STATES PATENT OFFICE 2,413,696

FLUOROHYDROCARBON

Frederick B. Downing, Carneys Point, and Anthony F. Benning and Robert C. McHarness, Woodstown, N. J., assignors to Kinetic Chemicals, Inc., Wilmington, Del., a corporation of Delaware No Drawing. Application June 29, 1944, Serial No. 542,820

1 Claim. (Cl. 260—653)

This invention relates to the preparation of organic fluorine compounds by pyrolysis. In the applications identified as Benning et al., Serial No. 344,666, filed July 10, 1940, issued as U. S. Patent 2,365,516, dated December 19, 1944, and Benning Serial No. 379,473, filed February 18, 1941, issued as U. S. Patent 2,343,252, dated March 7, 1944, are disclosed two processes involving a reaction between a fluorohydrocarbon and HCl in the presence of a catalyst. Those reactions may be described as additive, since their apparent course is the addition of HCl to the olefine in the place of double bonds. Those reactions were carried out at comparatively low temperatures, in most cases below 350° C., because those temperatures were satisfactory and because observations of a limited number of experiments at higher temperatures showed the existence of what were thought to be undesirable side reactions. We have now discovered that the side reactions are of a fundamentally different nature than HCl addition and that they can be put to valuable use.

It is an object of this invention to produce organic compounds by pyrolysis. Another object of the invention is to produce compounds which are useful, by methods which are economically and technically satisfactory. Another object of the invention is to produce new fluoro hydrocarbons. A particular object of the invention is to synthesize organic compounds having fluoralkyl chains by the pyrolysis of fluorohalogeno carbon compounds. Another object of the invention is to produce the compound $C_3F_6H_2$.

According to our invention fluoro-chloro or bromo alkanes, fluoro-chloro or bromo alkenes, and fluoro alkenes, which may otherwise be called fluoro-chloro or bromo saturated aliphatic, fluoro-chloro or bromo unsaturated aliphatic, and fluoro unsaturated aliphatic compounds, are made into other compounds by pyrolysis. As a starting material, we prefer to use $CHF_2Br$ which, when pyrolyzed under suitable conditions, will yield a reaction mixture containing $C_3F_6H_2$.

The compound $C_3F_6H_2$ is a new chemical compound which can be separated from the reaction mixture by fractional distillation. The compound $C_3F_6H_2$ is particularly adapted for use as a refrigerant in an absorptive or adsorptive system because of its boiling point, volatility, low toxicity and because it has two very active atoms for hydrogen bonding. These properties render it especially suitable for use in a system using a solvent having a donor atom such as polyglycol ethers and the like, and as an immersion medium for the quick freezing of foods as described in U. S. Patent 2,059,970. It is also useful as a solvent, as a reaction medium and as an intermediate in chemical syntheses.

Although for the production of particular compounds the reaction will be carried out under well-controlled conditions of time, temperature and pressure, complex mixtures of compounds of various molecular weights can be produced by subjecting the compounds to reaction conditions for extended periods of time. Pressures may also be used to vary the results, although for the purposes of economy and safety each particular reaction should be carried out with the lowest pressure consistent with optimum results. For example, pressures of four atmospheres absolute have been found satisfactory in many cases. In general, operations may be carried out at pressures between .1 and 10 atmospheres absolute, but other pressures are useful and may be employed when an increase in efficiency will result.

This is a pyrolytic process. The reaction is produced essentially by heat. It is, therefore, important to select a temperature which will efficiently produce the reaction. The temperature should be selected to give optimum production of the desired product. We have found that excellent pyrolytic results have been produced at temperatures between 600° and 1000° C., but that particular reactants have pyrolyzed at temperatures as low as 400° C. and above 1000° C. under appropriate conditions of time and pressure. Electrical heating is efficient, but any method of heating may be applied. The temperatures which are used must be chosen in view of the materials that compose the reaction apparatus.

The time of exposure of the reactants to the pyrolytic conditions is a matter of considerable importance where a particular product is desired. Extending the period of exposure frequently produces compounds of increased molecular weight.

In general, the reaction proceeds efficiently in the absence of catalysts.

The process is preferably carried out continuously by passing the convertible material through a tube heated to a pyrolytically effective temperature. The tube should be composed of a material which is inert to the reaction and the reaction products. Carbon and the noble metals are sufficiently inert and have proved to be satisfactory materials for the construction of reaction chambers. The chamber need not be wholly composed of the inert material, but may be lined with it. Reaction chambers containing a platinum lining are particularly satisfactory. The process may be carried out in batches rather than continuously, but continuity is preferred.

The following example has been carried out and has been selected for illustration. The applicants present this example, not as constituting any limitation of the work which has actually been done, but as sufficiently representative to enable persons skilled in the art to practice the invention. In this example, the terms "conversion" and "amount converted" include the assumption that the disappearance of one mol of the primary organic material resulted in the liberation of one mol of halogen acid. This assumption is warranted by the close agreement between the figures for conversion obtained by acid analysis and the actual primary material which disappeared. The temperatures of the reactions were measured with a thermocouple which was placed in contact with the outer surface of the reaction tube near the center of the heated zone, so that the true average temperatures of the gases in the tube may have been somewhat lower than the values given.

*Example XX*

$CHF_2Br$ was passed through a platinum-lined Inconel-jacketed nickel tube, 13.7 mm. i. d. x 108 cm., at a rate of about 42.6 g. per hour while the pressure in the tube was kept at approximately one atmosphere. The tube temperature was maintained at about 615° C. over an estimated length of 200 mm. by electrical heating. Free bromine was detected in the wash water. The reaction products were washed with water, dried and condensed in receivers cooled to about −70° C. A receiver cooled in liquid nitrogen was placed after the receiver cooled to −70° C. Acid analysis showed a conversion of about 46%. A total of about 179 g. of crude organic products were collected. The following compounds have been found in the reaction mass: $C_3F_6H_2$ having a boiling point of about 10–11° C. and a vapor density of 6.97 g/liter at 21° C. and 760 mm.; $CHF_3$ having a boiling point of −81° C.; $HC_3F_6Br$ boiling at 40°–41° C. and having a vapor density of 5.76 g. per liter at 28° C. and 452 mm.

Because of the wide differences in the boiling points of the components of the reaction mass, they can be readily separated by fractional distillation and the $C_3F_6H_2$ recovered. We believe that the compound $C_3F_6H_2$ has the structural formula $CHF_2-CF_2-CHF_2$, since, upon chlorination, it yields the known compound $CClF_2-CF_2-CClF_2$. A suitable method of chlorinating $C_3F_6H_2$ is as follows:

A 5-liter Pyrex flask was evacuated and 25 cc. of water was introduced, followed by 7.5 g. of $C_3F_6H_2$. Chlorine was then passed in (in absence of light) until the absolute pressure in the flask reached 1.2 atmospheres. The flask was then irradiated with a Photoflood lamp. The temperature rose from 30° C to 45° C. and the pressure fell. After the pressure became steady, irradiation was continued for two hours. The liquid content of the flask was poured out and the lower layer separated, washed successively with water, and 10% $Na_2SO_3$, and dried over $CaCl_2$. On distillation through a laboratory precision still, practically the entire product was found to boil at 34.6° C. at 760 mm. pressure.

From all of the above, it will be apparent that by our invention, we have obtained a novel chemical compound which has novel properties rendering it valuable and useful for a variety of purposes.

This is a continuation-in-part of our application Serial No. 435,064 for "Compositions of matter and pyrolytic methods of synthesizing them," filed March 17, 1942, issued as U. S. Patent 2,387,247, dated October 23, 1945.

We claim:

The compound represented by the formula $C_3F_6H_2$ which has a boiling point of about 10–11° C. and a vapor density of about 6.97 g./liter at 21° C. and 760 mm.

FREDERICK B. DOWNING.
ANTHONY F. BENNING.
ROBERT C. McHARNESS.